United States Patent [19]

Yang

[11] Patent Number: 4,670,699
[45] Date of Patent: Jun. 2, 1987

[54] CAPACITY-MOVEMENT MODEL AC INDUCTIVE MOTOR SWITCH-CHANGEOVER CAPACITY-TYPE SPEED CONTROL CIRCUIT

[76] Inventor: Tai-Her Yang, 5-1 Taipin St., Si-Hu Town, Dzan-Hwa, Taiwan

[21] Appl. No.: 688,511

[22] Filed: Jan. 2, 1985

[51] Int. Cl.[4] .............................................. H02P 5/28
[52] U.S. Cl. .................................... 318/814; 318/729
[58] Field of Search ............... 318/814, 816, 817, 729

[56] References Cited

U.S. PATENT DOCUMENTS

| 1,978,581 | 10/1934 | Johnson | 318/729 |
| 2,648,808 | 8/1953 | Tiede | 318/729 |
| 4,352,993 | 10/1982 | Hannas | 318/729 |

FOREIGN PATENT DOCUMENTS 3043368  6/1982  Fed. Rep. of Germany ...... 318/817

Primary Examiner—David Smith, Jr.
Attorney, Agent, or Firm—Leonard Bloom

[57] ABSTRACT

A switching arrangement for delivering power to an A.C. induction motor having a running winding and a start winding. A single-pole or double-pole, double-throw switch is provided for reversing current flow in the running winding is provided to reverse the rotational direction of the motor. A first four-position switch and a second four-position switch are operatively arranged to connect a first capacitor, a second capacitor and a resistor in three different circuit configurations with the windings across an A. C. power supply so as to provide three different rotational speeds under a given load. In a fourth position, the first and the second four-position switches effect a disconnection of the motor from the A. C. power supply.

10 Claims, 10 Drawing Figures

CAPACITY-MOVEMENT MODEL AC INDUCTIVE MOTOR SWITCH-CHANGEOVER CAPACITY-TYPE SPEED CONTROL CIRCUIT

BACKGROUND OF THE INVENTION

Conventional small A. C. motor energizing circuits usually use (1) motor winding tap (as shown in FIG. 1) or (2) external serial electric reactance or resistance (as shown in FIGS. 2 and 3) or (3) a solid-state element (as shown in FIGS. 4 and 5) such as a power transistor or SCR as the speed control means to adjust the voltage or phase. The technique mentioned in item (1), causes trouble during winding and making the motor. Moreover, motors so constructed produce noises (especially at the medium speed due to the unbalance in the magnetic field). The approach described in item (2) increases the cost and results in heat losses, while the starting torque is lower. The use of solid-state elements described in item (3) has a higher cost and, when the power transistor adjusts the voltage, results in large heat losses. In the case where the SCR is used to adjust the phase, motor noises result and radio interference becomes a problem.

SUMMARY OF THE INVENTION

The present invention utilizes a switching arrangement for varying the capacity value, thus changing the revolutionary speed of the motor under a fixed load. Since the magnetic field strengths produced by the running winding and the start winding of small capacity motors are usually very close, very often to the same winding is used to perform both functions, it is very effective to change over the values of the capacity serially connected to the start winding to serve running functions. The applicant has conducted a test using a 52″ ceiling fan, achieving three satisfactory speeds of 195 RPM, 125 RPM and 65 RPM. Since the resistance values of the rotors and windings and the leakage reactance of a small motor are rather large, the current change curve of its running characteristic is approximately 50% at approximately 25% at rated speed. At RPM's of about 25%, the current change of the running winding is not as great, particularly as the 50% and 100% levels are approached. It is quite economic to wind a running coil separately and the coil density in the slot can be also lowered, thus it is easy to lay wires in it and its heat dissipation effect is also very good.

A conventional capacity-change A. C. induction motor usually runs with high slip, and has full operating voltage applied thereto at differing rotational speeds. The slips, for example, can be as shown in TABLE I below.

TABLE I

|  | Number of poles | Synchronous revolving speed at 60 Hz. | Actual Max. revolving speed | Actual Min. revolving speed |
| --- | --- | --- | --- | --- |
| 6″ Ceiling Fan | 2 | 3600 | 2600 | 800 |
| 14″ Ceiling Fan | 4 | 1800 | 1350 | 150 |
| 52″ Ceiling Fan | 189 | 400 | 190 | 50 |

DETAILED DESCRIPTION OF THE PREFERRED EMBODIMENTS

Figure 1:
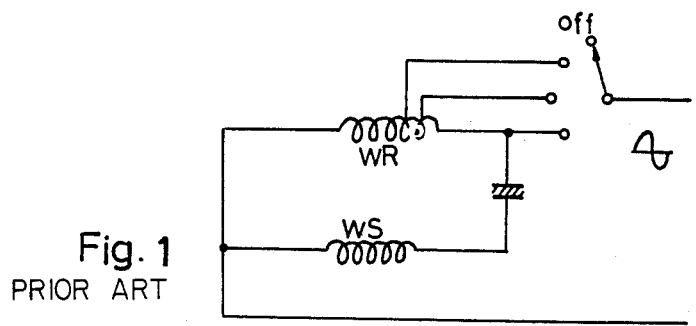
FIG. 1 is a schematic diagram of a conventional winding arrangement involving taps on a running winding of an A. C. induction motor.
Figure 2:
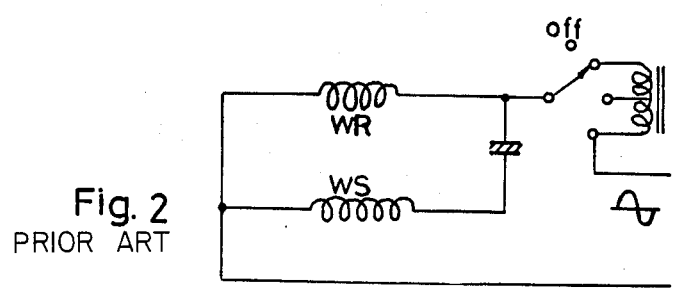
FIG. 2 is a schematic diagram of a conventional winding arrangement involving a tapped serial reactance in a path supplying current to start and running windings of an induction motor.
Figure 3:
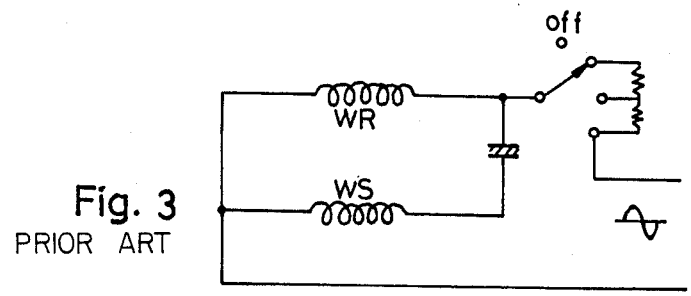
FIG. 3 a schematic diagram of a conventional winding arrangement involving a serial electric resistance in a path supplying current to start and running windings of an induction motor.
Figure 4:
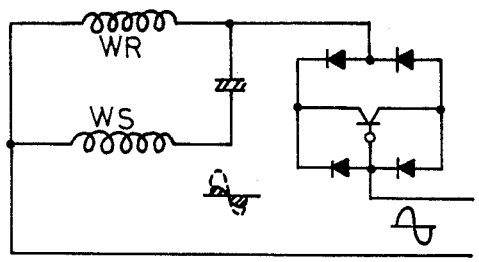
FIG. 4 is a schematic diagram of a conventional winding arrangement involving a transistor connected in the transmission path supplying current to the start and running windings of an induction motor.
Figure 5:
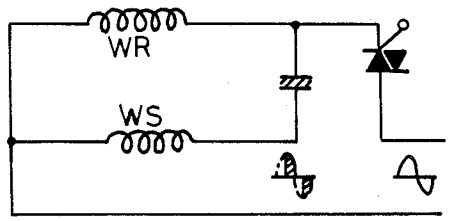
FIG. 5 is a schematic diagram of a conventional winding arrangement using a SCR in the path supplying current to the start and running windings of an induction motor.
Figures 6A, 6B:
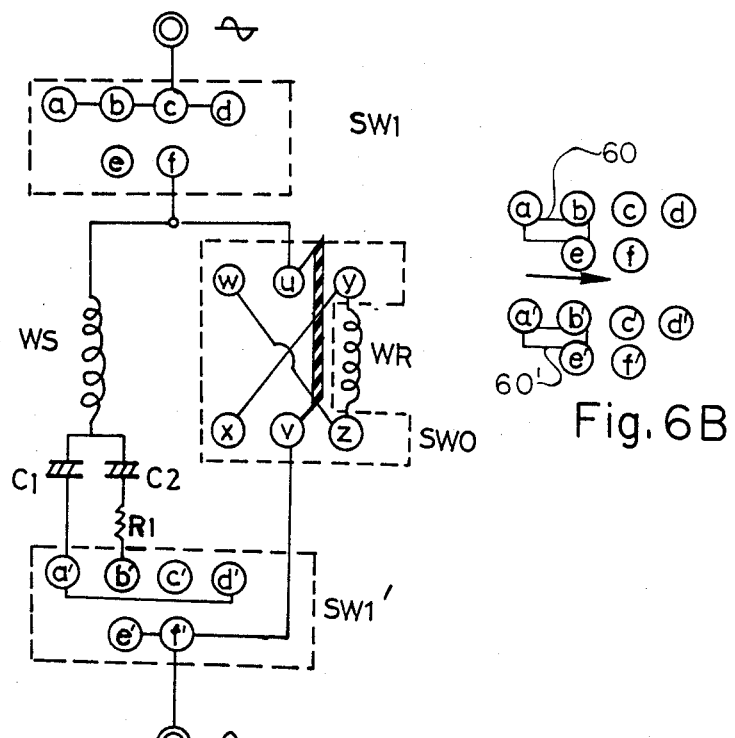
FIG. 6A is a schematic, wiring diagram of an induction motor switching arrangement in accordance with a first embodiment of the present invention.
FIG. 6B is a diagramatic illustration of two of the switches of FIG. 6A, the contact bars thereof being shown.

As shown in FIG. 6A an A. C. induction motor, in accordance with a first embodiment of the invention, is provided with running winding WR and start winding WS. The running winding WR is operatively connected to a double-pole, double-throw switch SW0 to control selectively the positive revolutions and the counter revolutions; that is, the rotational direction of the motor. Switches SW1 and SW1′ are provided for connecting the windings WS and WR, the latter via the switch SW0, across the A. C. input connections. The switches SW1 and SW1′ may be of the rotation type or the linear (push) type, as is conventional, each in this case in accordance with the present invention includes six connector lugs a–f and a′–f′, respectively, interconnected conductively as shown. The switches SW1 and SW1′ each have four positions, each position effecting connections between and among the connector lugs in accordance with TABLE II shown below, the table making reference to the rotational switch type in degrees (0°) and to the linear type by positions 0-3.

TABLE II

| Push Type Cyclic Type | Position 0 0°(360°) | Position 1 90° | Position 2 180° | Position 3 270° |
|---|---|---|---|---|
| SW1 | a | b e | c f | d |
| SW1' | a' e' | b' f' | c' | d' |

The switches SW1 and SW1' include, as diagramatically shown in FIG. 6B, respective movable conductive members (bars) 60 and 60' which, in the four positions, taken with the other circuitry, connect the lugs a–f and a'–f' as set out below in TABLE III, with the result that the capacitors C1 and C2 are connected in their four possible orientations into and out of the switching arrangement as set out below in TABLE III.

TABLE III

| connector lugs relationship | Switch position | | | |
|---|---|---|---|---|
| | 0 | 1 | 2 | 3 |
| SW1 | a,d mutually conductive | a,b,e mutually conductive | a,c,e,f mutually conductive | c,d,f mutually conductive |
| SW' | a',d' mutually conductive | a',b',e' mutually conductive | a',c',e',f' mutually conductive | c',d',f' mutually conductive |
| capacitance | | C1 + C2 | C2 | C1 |

The salient features of the switching arrangement, as illustrated in FIGS. 6A and 6B, result in different circuit connections for capacitors C1, C2 and resistor R1, which as illustrated is in series with capacitor C2. The connector lugs a, b and c of the switch SW1 are mutually connected and also connected to the one end of an A. C. power supply. The connector lugs e and f are mutually connected and also connected to the input contact foot U of the double-pole, double-throw switch SW0 and to one end of the start winding WS. Connector lugs W and Z, of the double-throw switch SW0 are conductively connected to one another and connector lugs Y and X of this switch are also conductively connected to one another. The running winding WR is connected between lugs Y and Z or between lugs W and X, via the lugs Y and Z, depending on the position of the switch SW0. An input contact foot V, of the double-throw switch SW0, and the connector lugs e' and f' of the switch SW1' are mutually conductive, the lugs e' and f' being connected to the other end of the A. C. power supply. The connector lugs a' and d' of the switch SW1' are mutually conductive. The end of the common connecting wires from the capacitors C1 and C2 are connected to the other end of the start winding WS. The other connector from the capacitor C1 is connected to lug a' of the switch SW1', while the other connector from the capacitor C2 is connected to one end of the serial resistor R1, the other end of which is connected to the lug b'.

Figures 7A, 7B:
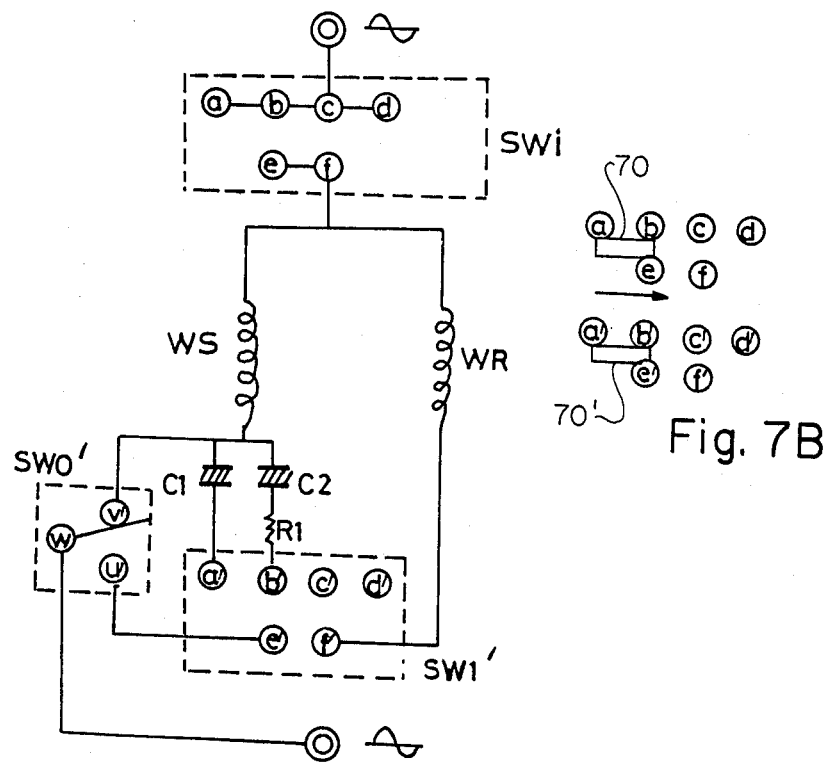
FIG. 7A is a schematic, wiring diagram of an induction motor switching arrangement in accordance with a second embodiment of the present invention.
FIG. 7B is a diagramatic illustration of two of the switches shown in FIG. 7A, the contact bars thereof being shown.

As shown in FIGS. 7A and 7B, an induction electric motor switching arrangement is provided with the same or exchangeably used start winding WS and running winding WR in accordance with a second embodiment of the present invention. A single-pole double-throw switch SW' is used to select the direction of rotation of the motor. Switches SW1 and SW1' are provided for effecting different connections among lugs a–f and a'–f' of the switches SW1 and SW2, movable conductive members (bars) 70 and 70' illustrated diagramatically in FIG. 7B being provided for this purpose. The switches SW1 and SW1' may be of the rotational type or the linear (push) type. The resulting connections between the lugs a–f and a'–f' in terms of switch positions of the switches SW1 and SW1' is set out below in TABLE IV.

TABLE IV

| Push Type Cyclic Type | Position 0 0°(360°) | Position 1 90° | Position 2 180° | Position 3 270° |
|---|---|---|---|---|
| SW1 | a | b e | c f | d |
| SW1' | a' | b' e' | c' f' | d' |

The switches SW1 and SW1' include the respective conductive members (bars) 70 and 70' (FIG. 7B) which in the four positions, taken with the other circuitry, connect the lugs a–f and a'–f' as shown below in TABLE V with the result that condensors C1 and C2 are connected into and out of the switching arrangement as set out in TABLE V, depending upon which of the four positions the switches SW1 and SW1' are in.

TABLE V

| connector lugs relationship | Switch position | | | |
|---|---|---|---|---|
| | 0 | 1 | 2 | 3 |
| SW1 | a,d mutually conductive | a,b,e mutually conductive | a,c,e,f mutually conductive | c,d,f mutually conductive |
| SW' | a',d' mutually conductive | a',b',e' mutually conductive | a',c',e',f' mutually conductive | c',d',f' mutually conductive |
| capacitance | | C1 + C2 | C2 | C1 |

The salient features of the switching arrangement illustrated in FIGS. 7A and 7B result in different circuit connections for the capacitors C1, C2 and resistor R1, which as illustrated is in series with the capacitor C2. The connector lugs a, b and c of the switch SW1 are mutually connected and also connected to one end of the A. C. power supply. The connector lugs e and f are mutually connected and also connected to a common wire connecting an end of each of the start winding WS and the running winding WR. Pole foot W' of a single-pole, double-throw switch SW0' and the other end of the A. C. power supply are mutually conductive. The contact foot U' of the switch SW0' and the connector lug e' of the switch SW1' are mutually conductive and connected to the other end of the running winding WR. The lugs a' and d' of the switch SW1' are mutually conductive. The common wire connecting one end of each of the capacitors C1 and C2 is connected to the other end of the start winding WS and, via the contact foot V', to the connector lug W' of the switch SW0'. The other conductor from the capacitor C1 is connected to the lug a' and the other conductor from the capacitor C2 is serially connected to the resistor R1, the other end of which is connected to the lug b'.

Figures 8A, 8B:
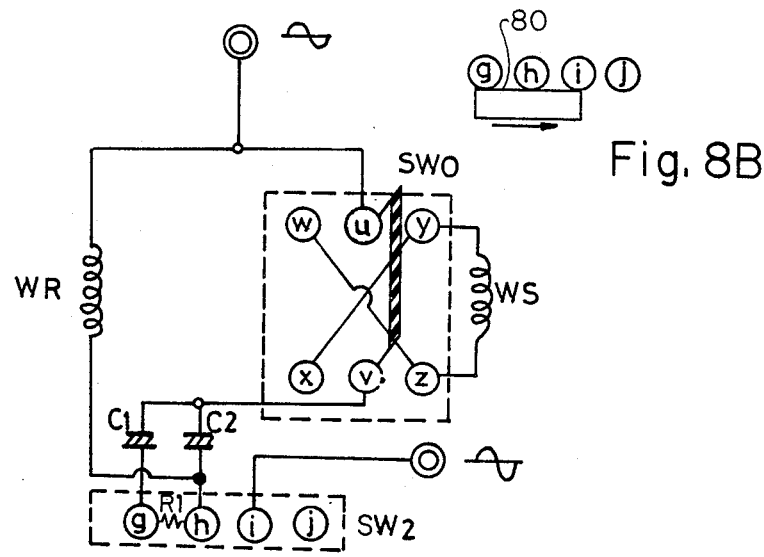
FIG. 8A is a schematic, wiring diagram of an induction motor switching arrangement in accordance with a third embodiment of the present invention.
FIG. 8B is a diagramatic illustration of one of the switches shown in FIG. 8A, a contact bar being shown.

In accordance with the third embodiment of the present invention shown in FIGS. 8A and 8B, an A. C. induction motor is provided with a running winding WR, a start winding WS, and is additionally provided with a double-pole, double-throw switch SW0 to control the rotational direction of the motor. A switch SW2 which may be of the rotary type or the linear (push) type for effecting the changeover, depending on the position of the movable conductive member (bar) 80, is illustrated diagramatically in FIG. 8B. The member 80 comes into contact with a different ones of lugs g–j of the switch SW2, depending on its positions, the four possible positions being set out below in TABLE VI.

TABLE VI

| Push Type Rotary Type | Position 0 0°(360°) | Position 1 90° | Position 2 180° | Position 3 270° |
|---|---|---|---|---|
| SW2 | g | h | i | j |

As a result of the action of the switch SW2, the lugs g–j and the capacitors C1 and C2 and the resistor R1 are connected in circuit as summarized below in TABLE VII.

TABLE VII

| connector lugs relationship | Switch position | | | |
|---|---|---|---|---|
| | 0 | 1 | 2 | 3 |
| SW2 | g,h,j mutually conductive | g,h,i mutually conductive | h,i,j mutually conductive | g,i,j mutually conductive |
| capacitance | | C1 + C2 | C1 + C2 (R1 in series with C1) | C2 + C1 (R1 in series with C2) |

The salient connective features of switching arrangement illustrated in FIGS. 8A and 8B are similar to the resulting connections of the other embodiments. The connector lugs W and Z of the double-pole, double-throw switch SW0 are mutually conductive and its connector lugs X and Y are also mutually conductive and connected to respective ends of the running winding WR. A contact foot lug U of the double-pole, double-throw switch SW0 and one end of the start winding WS are mutually conductive and connected to one end of an A. C. power supply. The other end of the start winding WS is connected to a connector lug h of SW2. The common wire connecting ends of capacitors C1 and C2 is connected to a contact foot V of the switch SW0. The other end of the capacitor C1 is connected to the lug g of the switch SW2, and the other end of the capacitor C2 is connected to the lug h of switch SW2, and a resistor R1 is serially connected between the connector lugs g and h.

Figures 9A, 9B:
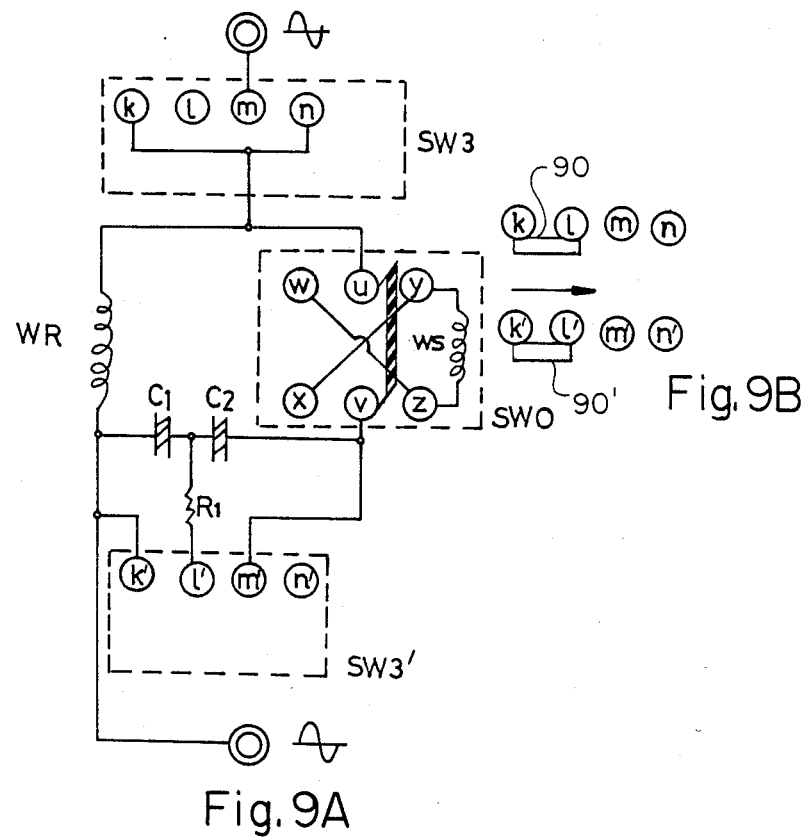
FIG. 9A is a schematic, wiring diagram of an induction motor switching arrangement in accordance with a fourth embodiment of the present invention.
FIG. 9B is a diagramatic illustration of two of the switches of FIG. 9A, two contact bars thereof being shown.

The fourth embodiment of the circuit of the present invention is, as shown in FIG. 9A for an A. C. induction motor provided with a running winding WR and a start winding WS. The circuit also includes a double-pole, double-throw switch SW0 to control the direction of rotation of the motor. Two switches SW3 and SW3', which may be of either the rotary type or the linear (push), are provided. Two conductive members 90, 90' are provided to selectively connect lugs k–m and k'–m', as illustrated diagramatically in FIG. 9B, the connections being set out below in TABLE VIII for each of four positions 0–3.

TABLE VIII

| Push Type Rotary Type | Position 0 0°(360°) | Position 1 90° | Position 2 180° | Position 3 270° |
|---|---|---|---|---|
| SW3 | k | l | m | n |
| SW3' | k' | l' | m' | n' |

As a result of the actions of the switches SW3 and SW3', the lugs k–n and k'–n', and capacitors C1 and C2, with resistor R1, are connected in a number of possible configurations, as summarized below in TABLE IX.

TABLE IX

| connector lugs relationship | Switch position | | | |
|---|---|---|---|---|
| | 0 | 1 | 2 | 3 |
| SW3 | n,k mutually conductive | k,l mutually conductive | l,m mutually conductive | m,n mutually conductive |
| SW3' | n',k' mutually conductive | k',l' mutually conductive | l',m' mutually conductive | m',n' mutually conductive |
| capacitance | | C2 | C1 | $\frac{C1 \times C2}{C1 + C2}$ |

The salient features of the switching arrangement shown in FIGS. 9A and 9B involve a number of important connections. The connector lugs 1 and m of the switch SW1 are mutually conductive and are also connected to one terminal of the A. C. power supply. The connector lugs k and n are mutually conductive and are also connected to the input foot U of the double-pole, double-throw switch SW0 and to one end of the start winding WS. Connector lugs W and Z of the double-pole, double-throw switch SW0 are mutually conductive, as are the connector lugs X and Y. The running winding WR is connected between the lugs Y and Z. The input foot V of double-throw switch SW0 and the connector lug m' of the switch SW3' are mutually conductive and are connected to one end of the capacitor C2. The common wire connecting one end of each of the capacitors C1 and C2 to one another is serially connected to the current limiting resistor R1, its other end being connected to the connector lug 1' of the switch SW3'. The other connector lug of the capacitor C1 and the other end of the start winding WS are connected to the connector lug k' of the switch SW3' and to the other end of the A. C. power supply. The discharge current limiting resistor R1, as shown, is serially connected to the common connection between the capacitors C1 and C2.

Figures 10A, 10B:
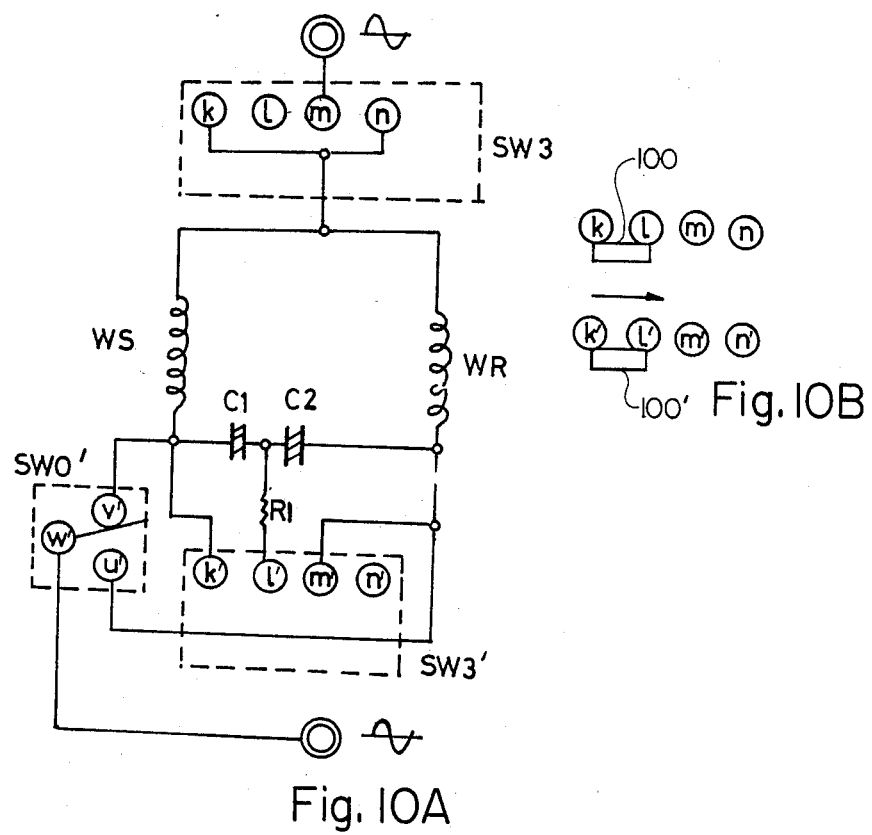
FIG. 10A is a schematic, wiring diagram of an induction motor switching arrangement in accordance with a fifth embodiment of the present invention.
FIG. 10B is a diagramatic illustration of two of the switches of FIG. 10A, two contact bars thereof being shown.

In accordance with a fifth exemplary embodiment of the invention, as shown in FIGS. 10A and 10B, an electric induction motor includes a start winding WS, a running winding WR and a single-pole, double-throw switch SW0' used to select the rotational direction of the motor. Switches SW3 and SW3', which may be either of the rotary type, or linear (push) type are for effecting differing connections to the lugs k–m and k'–m' from the A. C. power supply. Depending on which of the four positions these switches are in, the connections are as tabulated in TABLE X below.

TABLE X

| Push Type Rotary Type | Position 0 0°(360°) | Position 1 90° | Position 2 180° | Position 3 270° |
|---|---|---|---|---|
| SW3 | k | l | m | n |
| SW3' | k' | l' | m' | n' |

As a result of the action of the action of the switches SW3 and SW3', which move the conductive members (bars) 100 and 100'(FIG. 10B) and the rest of the circuitry, the lugs k–n, k'–n', the capacitors C1 and C2, and the resistor R1 are differently innerconnected, depending on which of the four positions these switches are in.

The lug connections and effective capacitance results are set out in TABLE XI below.

TABLE IX

| connector lugs relationship | Switch position | | | |
|---|---|---|---|---|
| | 0 | 1 | 2 | 3 |
| SW3 | k,n mutually conductive | k,l mutually conductive | l,n mutually conductive | m,n mutually conductive |
| SW3' | k',n' mutually conductive | k',l' mutually conductive | l',n' mutually conductive | m',n' mutually conductive |
| capacitance | | C2 | C1 | $\frac{C1 \times C2}{C1 + C2}$ |

The salient features of the embodiment illustrated in FIGS. 10A and 10B include the fact that the connector lugs of the switch SW3 are mutually connected or set out in TABLE XI and are also connected to one end of the A. C. power supply. The connector lugs k and n are mutually connected and also connected to the common wire connected to one end of the start winding WS and to one end of the running winding WR. The foot U' of the single-pole, double-throw switch SW0' and the other end of the A. C. power supply are mutually conductive. The foot Y' of double-throw switch SW0' and the connector lug m' of the switch SW3' and one end of the capacitor C2 are mutually conductive and connected to the other end of the running winding WR. The common wire connecting common ends of the capacitors C1 and C2 is serially connected, via the current limiting resistor R1, to the connector lug 1' of the switch SW3.

What is claimed is:

1. In a switching arrangement for delivering power to an A.C. induction motor having a running winding and a start winding, an improvement comprising a first capacitance, a second capacitance, a resistance and a four-position switching means for selectively interconnecting in three differing configurations said running winding, said start winding, said first capacitance, said second capacitance and said resistance across an A. C. power source in respective ones of three positions of said four-position switching means, said four-position switching means in a fourth position effecting a disconnection of the induction motor from the A. C. power source, wherein said four-position switching means is constituted by a first four-position switch having a first conductive lug, a second conductive lug, a third conductive lug, a fourth conductive lug, a fifth conductive lug and a sixth conductive lug, said first, said second and said third conductive lugs being conductively connected and said fifth and said sixth conductive lugs being conductively connected, and by a second four-position switch having a seventh conductive lug, an eighth conductive lug, a ninth conductive lug, a tenth conductive lug, an eleventh conductive lug and a twelfth conductive lug, said seventh and said tenth conductive lugs being conductively connected and said eleventh and said twelfth conductive lugs being conductively connected;

wherein said fifth lug and said sixth lug are conductively connected to first ends of said running winding and said start winding, and said eleventh and said twelfth lugs are conductively connected to the other end of said running winding;

wherein said first capacitance is a first capacitor connected between said seventh lug and the other end said start winding, said resistance is a resistor and said second capacitance is a second capacitor, said resistor and said second capacitor being connected in series with one another between the eighth lug and the other end of the start winding;

wherein when said first switch and said second switch are in a first position, said first, said second and said fifth lugs are conductively connected to each other, and said seventh, said eighth and said eleventh lugs are conductively connected to each other;

wherein when said first switch and said second switch are in a second position, said first, said third, said fifth and said sixth lugs are conductively connected to each other, and said seventh, said ninth, said eleventh and said twelfth lugs are conductively connected to each other; and wherein when said first switch and said second switch are in a third position, said third, said fourth and said sixth lugs are conductively connected to each other, and said ninth, said tenth and said twelfth lugs are conductively connected to each other.

2. The arrangement according to claim 1, including an additional switching means for reversing current flow in one of said windings to reverse rotational direction of the induction motor.

3. In a switching arrangement for delivering power to an A.C. induction motor having a running winding and a start winding, an improvement comprising a first capacitance, a second capacitance, a resistance and a four-position switching means for selectively interconnecting in three differing configurations said running winding, said start winding, said first capacitance, said second capacitance and said resistance across an A.C. power source in respective ones of three positions of said four-position switching means, said four-position switching means in a fourth position effecting a disconnection of the induction motor from the A.C. power source, wherein said four-position switching means is constituted by a first four-position switch having a first conductive lug, a second conductive lug, a third conductive lug, a fourth conductive lug, a fifth conductive lug and a sixth conductive lug, said first, said second and said third conductive lugs being conductively connected and said fifth and said sixth conductive lugs being conductively connected, and by a second four-position switch having a seventh conductive lug, an eighth conductive lug, a ninth conductive lug, a tenth conductive lug, an eleventh conductive lug and a twelfth conductive lug, said seventh and said tenth conductive lugs being conductively connected and said eleventh conductive lug being connectable to a terminal of the A.C. power source;

wherein said fifth lug and said sixth lug are conductively connected to first ends of said running winding and said start winding, and said twelfth lug is conductively connected to the other end of said running winding;

wherein said first capacitance is a first capacitor connected between said seventh lug and the other end said start winding, said resistance is a resistor and said second capacitance is a second capacitor, said resistor and said second capacitor being connected in series with one another between the seventh lug and the other end of the start winding;

wherein when said first switch and said second switch are in a first position, said first, said second and said fifth lugs are conductively connected to each other, and said seventh, said eighth and said twelfth lugs are conductively connected to each other;

wherein when said first switch and said second switch are in a second position, said first, said third, said fifth and said sixth lugs are conductively connected to each other, and said seventh, said ninth, said eleventh and said twelfth lugs are conductively connected to each other; and wherein when said first switch and said second switch are in a third position, said third, said fourth and said sixth lugs are conductively connected to each other, and said ninth, said tenth and said twelfth lugs are conductively connected to each other.

4. The arrangement according to claim 3, including an additional switching means for reversing current flow in one of said windings to reverse rotational direction of the induction motor.

5. In a switching arrangement for delivering power to an A.C. induction motor having a running winding and a start winding, an improvement comprising a first capacitance, a second capacitance, a resistance and a four-position switching means for selectively interconnecting in three differing configurations said running winding, said start winding, said first capacitance, said second capacitance and said resistance across an A.C. power source in respective ones of three positions of said four-position switching means, said four-position switching means in a fourth position effecting a disconnection of the induction motor from the A.C. power source, wherein said four-position switching means is constituted by a four-position switch having a first conductive lug, a second conductive lug, a third conductive lug and a fourth conductive lug;

wherein first ends of said running winding and said start winding are connectable to a terminal of the A.C. power source;

wherein said first capacitance is a first capacitor connected between said first lug and the other end said running winding, said resistance is a resistor connected between said first lug and said second lug, said second capacitance is a second capacitor connected between the second lug and the other end of the running winding, and said second lug is connected to the other end of the start winding;

wherein when said switch is in a first position, said first, said second and said third lugs are conductively connected to each other;

wherein when said switch is in a second position, said first, said third and said fourth lugs are conductively connected to each other; and wherein when said switch is in a third position, said first, said third and said fourth lugs are conductively connected to each other.

6. The arrangement according to claim 5, including an additional switching means for reversing current flow in one of said windings to reverse rotational direction of the induction motor.

7. In a switching arrangement for delivering power to an A.C. induction motor having a running winding and a start winding, an improvement comprising a first capacitance, a second capacitance, a resistance and a four-position switching means for selectively interconnecting in three differing configurations said running winding, said start winding, said first capacitance, said second capacitance and said resistance across an A.C. power source in respective ones of three positions of said four-position switching means, said four-position switching means in a fourth position effecting a disconnection of the induction motor from the A.C. power source, wherein said four-position switching means is constituted by a first four-position switch having a first conductive lug, a second conductive lug, a third conductive lug, and a fourth conductive lug, said first an said fourth conductive lugs being conductively connected and said second and said third conductive lugs being conductively connected, and by a second four-position switch having fifth conductive lug, a sixth conductive lug, a seventh conductive lug and an eighth conductive lug;

wherein said first lug and said fourth lug are conductively connected to first ends of said running winding and said start winding, said seventh lug being conductively connected to the other end of said running winding and said fifth lug being connected to the other end of the start winding;

wherein said resistance is a resistor and said first capacitance is a first capacitor connected between the other end of the start winding and said sixth lug via said resistor, and said second capacitance is a second capacitor connected between the other end of the start winding and said sixth lug via said resistor;

wherein when said first switch and said second switch are in a first position, said first and said second lugs are conductively connected to one another, and said fifth and said sixth lugs are conductively connected to one another;

wherein when said first switch and said second switch are in a second position, said first and said third lugs are conductively connected to one another, and said fifth and said seventh lugs are conductively connected to one another; and wherein when said first switch and said second switch are in a third position, said third and said fourth lugs are conductively connected to one another, and said seventh and said eighth lugs are conductively connected to one another.

8. The arrangement according to claim 7, including an additional switching means for reversing current flow in one of said windings to reverse rotational direction of the induction motor.

9. In a switching arrangement for delivering power to an A.C. induction motor having a running winding and a start winding, an improvement comprising a first capacitance, a second capacitance, a resistance and a four-position switching means for selectively interconnecting in three differing configurations said running winding, said start winding, said first capacitance, said second capacitance and said resistance across an A.C. power source in respective ones of three positions of said four-position switching means, said four-position switching means in a fourth position effecting a disconnection of the induction motor from the A.C. power source, wherein said four-position switching means is constituted by a first four-position switch having a first conductive lug, a second conductive lug, a third conductive lug and a fourth conductive lug, said first and said fourth conducitve lugs being conductively connected and said second and said third conductive lugs being conductively connected, and by a second four-position switch have fifth conductive lug, a sixth conductive lug, a seventh conductive lug and an eighth conductive lug;

wherein said first lug and said fourth lug are conductively connected to first ends of said running winding an said start winding, said fifth lug is conductively connected to the other end of the start winding, and said seventh lug is conductively connected to the other end of said running winding;

wherein said resistance is a resistor, said first capacitance is a first capacitor connected between the other end of the start winding and said sixth lug via said resistor, and said second capacitance is a second capacitor, said second capacitor being connected between the other end of the running winding and the sixth lug via said resistor;

wherein when said first switch and said second switch are in a first position, said first and said second lugs are conductively connected to one another, and said fifth and said sixth lugs are connected to one another;

wherein when said first switch and said second switch are in a second position, said first and said fourth lugs are conductively connected to one another, and said sixth and said eighth lugs are conductively connected to one another; and wherein when said first switch and said second switch are in a third position, said third and said fourth lugs are conductively connected to one another, and said seventh and said eighth lugs are conductively connected to one another.

10. The arrangement according to claim 9, including an additional switching means for reversing current flow in one of said windings to reverse rotational direction of the induction motor.

* * * * *